(12) United States Patent
Chiang

(10) Patent No.: US 6,725,757 B1
(45) Date of Patent: Apr. 27, 2004

(54) SCROLL SAW WITH A SAW BLADE THAT IS EASY TO REPLACE

(76) Inventor: Pei-Lieh Chiang, No. 12, Nan-Ping Rd., Nan Dist., Taichung City (TW)

( * ) Notice: Subject to any disclaimer, the term of this patent is extended or adjusted under 35 U.S.C. 154(b) by 0 days.

(21) Appl. No.: 10/401,069

(22) Filed: Mar. 27, 2003

(30) Foreign Application Priority Data

Feb. 18, 2003 (TW) ........................................ 92202516 U

(51) Int. Cl.⁷ .............................................. B27B 19/10
(52) U.S. Cl. ................... 83/783; 83/581.1; 83/698.71; 83/699.21
(58) Field of Search ................... 83/783–786, 699.21, 83/698.31, 698.71, 699.51, 581.1; D15/133

(56) References Cited

U.S. PATENT DOCUMENTS

| | | | | |
|---|---|---|---|---|
| 4,603,614 A | * | 8/1986 | Charonnat | 83/784 |
| 4,681,006 A | * | 7/1987 | Miller | 83/581.1 |
| 4,825,741 A | * | 5/1989 | Wellington et al. | 83/786 |
| 5,088,369 A | * | 2/1992 | Rice et al. | 83/783 |
| 5,327,807 A | * | 7/1994 | Chang | 83/783 |
| 5,662,017 A | * | 9/1997 | Mellon | 83/783 |
| 5,992,283 A | * | 11/1999 | Chen | 83/581.1 |
| H1867 H | * | 10/2000 | Quiram | 83/699.21 |
| D446,228 S | * | 8/2001 | Hsu | D15/133 |
| 6,463,840 B1 | * | 10/2002 | Chang | 83/783 |
| 6,474,211 B1 | * | 11/2002 | Lin | 83/783 |
| 6,619,174 B1 | * | 9/2003 | Chiang | 83/698.31 |

* cited by examiner

*Primary Examiner*—Allan N. Shoap
*Assistant Examiner*—Jason Prone
(74) *Attorney, Agent, or Firm*—Akin Gump Strauss Hauer & Feld LLP

(57) ABSTRACT

A scroll saw includes upper and lower driving arms, a saw blade, a blade retaining unit, push rod, a biasing unit, and an actuating unit. The blade retaining unit includes a pivot seat mounted pivotally on a distal end of the upper driving arm, and an upper blade holder mounted on the pivot seat. The pivot seat is pivotable relative to the upper driving arm from a first position, where the upper blade holder engages an upper blade end of the saw blade, to a second position, where the upper blade holder disengages from the upper blade end. The biasing unit provides a biasing force that pivots the pivot seat to the first position. The actuating unit provides a pressing force on the push rod to push the pivot seat to pivot to the second position so as to permit release of the saw blade.

9 Claims, 6 Drawing Sheets

US 6,725,757 B1

SCROLL SAW WITH A SAW BLADE THAT IS EASY TO REPLACE

CROSS-REFERENCE TO RELATED APPLICATION

This application claims priority of Taiwanese application no. 092202516, filed on Feb. 18, 2003.

BACKGROUND OF THE INVENTION

1. Field of the Invention

The invention relates to a scroll saw, more particularly to a scroll saw with a saw blade that is easy to replace.

2. Description of the Related Art

Referring to FIG. 1, a conventional scroll saw 1 is shown to include a pair of upper and lower driving arms 11, 12, a shank 13, a rotary knob 14, a biasing member 15, an upper blade holder 16, a lower blade holder 17, and a saw blade 18. The shank 13 is formed with a threaded section 131 that extends through a distal end 111 of the upper driving arm 11 so as to engage the rotary knob 14, and a coupling section 132 opposite to the threaded section 131 and coupled to the upper blade holder 16. The biasing member 15 is sleeved on the coupling section 132 and has one end abutting against the upper driving arm 11 and an opposite end abutting against the upper blade holder 16. The lower blade holder 17 is mounted fixedly on the lower driving arm 12. The saw blade 18 has an upper end portion 181 that engages removably the upper blade holder 16, and an opposite lower end portion 182 that engages removably the lower blade holder 17.

In use, when the rotary knob 14 is rotated to move the shank 13 upwardly, the upper blade holder 16 will move accordingly for increasing the tension of the saw blade 18 and for preventing removal of the saw blade 18 from the upper and lower blade holders 16, 17. On the other hand, when the rotary knob 14 is rotated to move the shank 13 downwardly, the saw blade 18 can be removed from the upper and lower blade holders 16, 17 for replacement purposes.

The following are some of the drawbacks of the aforesaid conventional scroll saw 1:

1. Quick attachment or removal of the saw blade 18 is not possible because of the need to rotate the rotary knob 14 before the upper blade holder 16 can be moved to engage or disengage from the upper end portion 181 of the saw blade 18.
2. Proper adjustment of the blade tension cannot be conveniently conducted due to the threaded engagement between the shank 13 and the rotary knob 14. When the tension of the saw blade 18 is too high, the saw blade 18 tends to break easily. On the other hand, when the tension of the saw blade 18 is too low, the saw blade 18 tends to wobble during a cutting operation.

SUMMARY OF THE INVENTION

Therefore, the object of the present invention is to provide a scroll saw that can overcome the aforesaid drawbacks associated with the prior art.

Accordingly, a scroll saw of this invention comprises:

upper and lower driving arms, each of which has a distal end;

a saw blade having upper and lower blade ends;

a blade retaining unit including a lower blade holder mounted on the distal end of the lower driving arm to hold removably the lower blade end, a pivot seat mounted pivotally on the distal end of the upper driving arm, and an upper blade holder mounted on the pivot seat, the pivot seat being pivotable relative to the upper driving arm from a first position, where the upper blade holder engages the upper blade end, to a second position, where the upper blade holder disengages from the upper blade end;

a push rod having a connecting end coupled to the pivot seat, and a pressing end opposite to the connecting end;

a biasing unit for providing a biasing force that enables the pivot seat to pivot to the first position; and an actuating unit operable so as to provide a pressing force on the pressing end of the push rod for enabling the push rod to push the pivot seat to pivot to the second position against biasing action of the biasing unit so as to permit release of the saw blade from the upper and lower blade holders.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
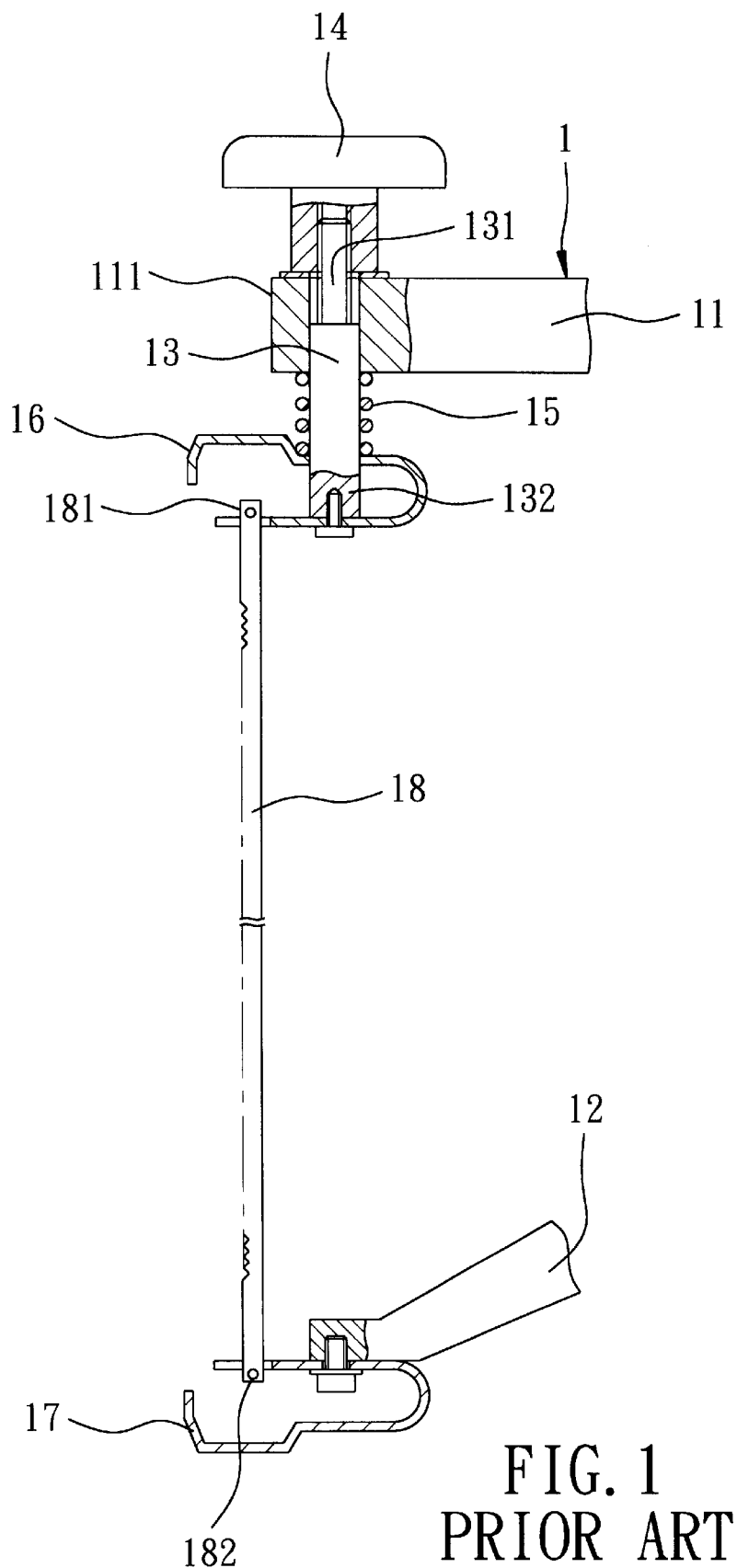
FIG. 1 is a fragmentary schematic view of a conventional scroll saw.
Figure 2:
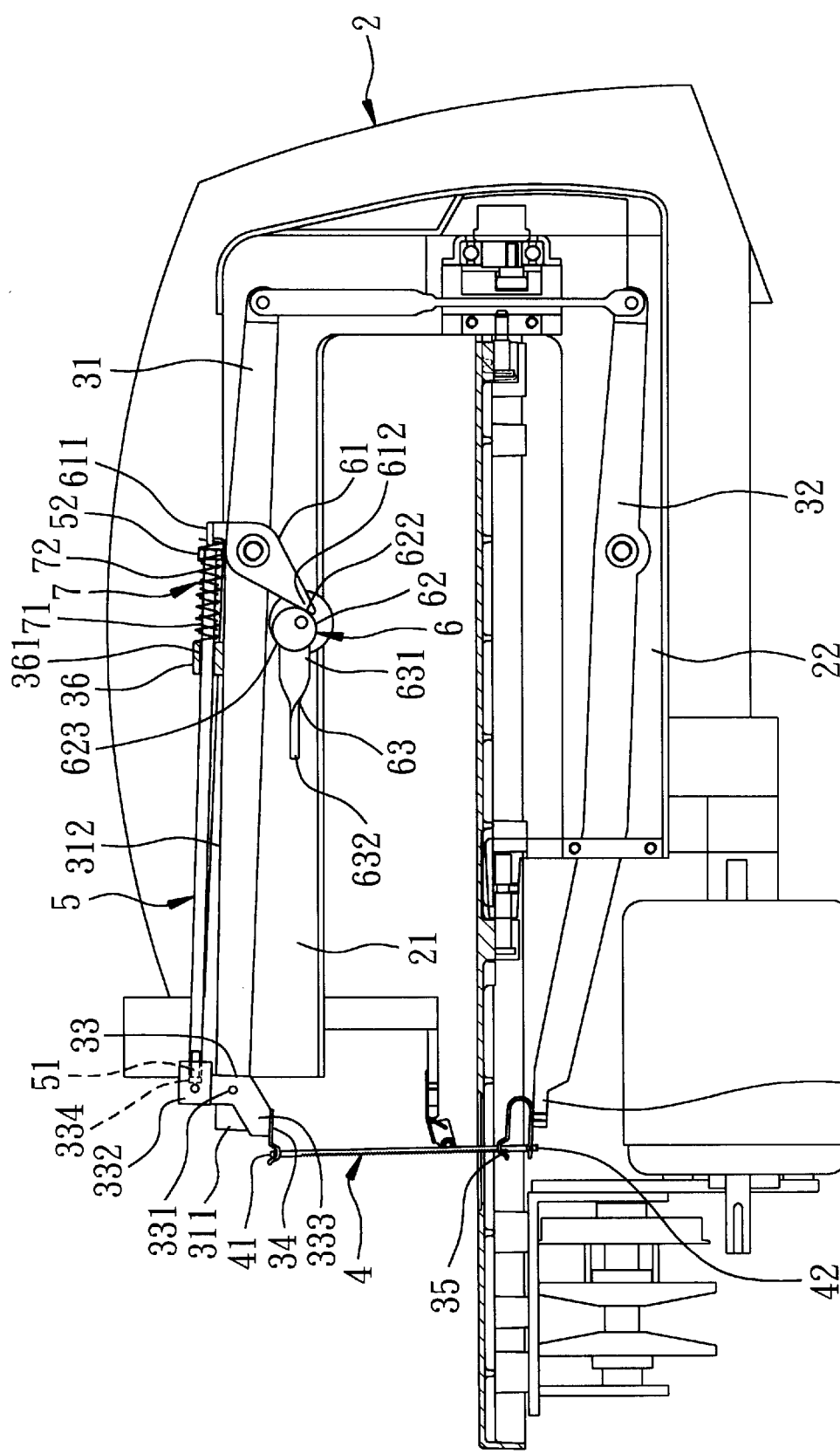
FIG. 2 is a schematic partly sectional view of the preferred embodiment of a scroll saw according to the present invention.
Figure 3:
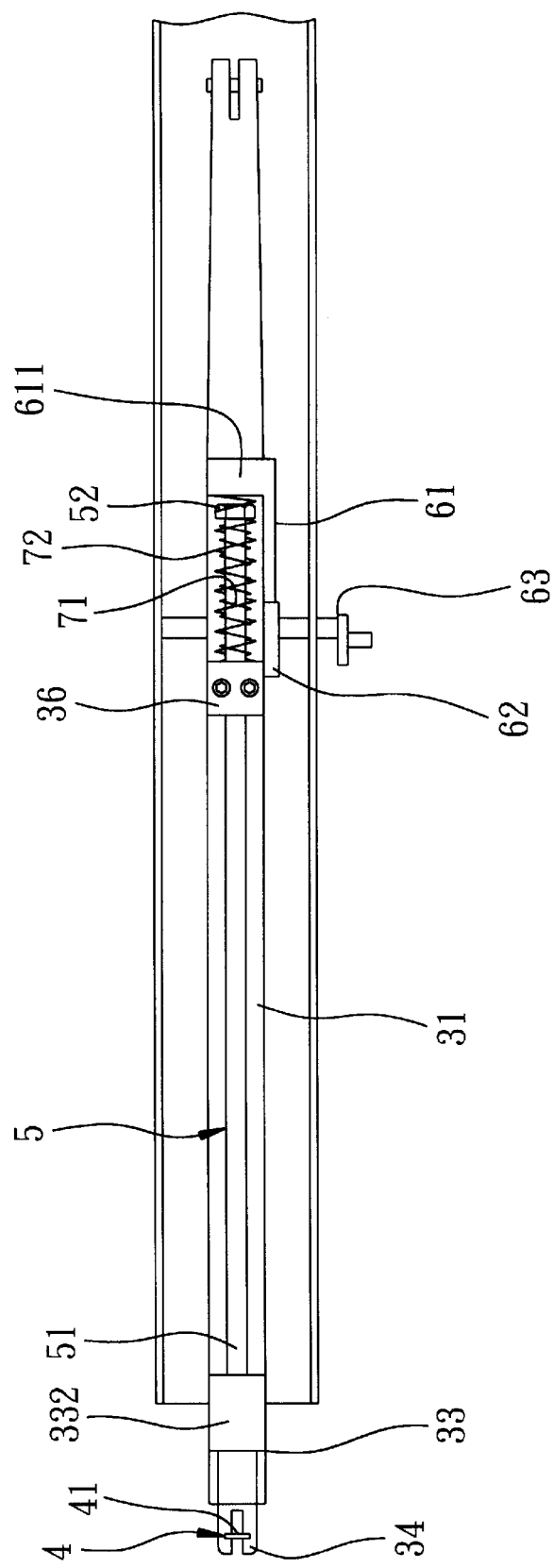
FIG. 3 is a top view showing how a blade end of a saw blade is retained on a driving arm in the preferred embodiment.

Referring to FIGS. 2 and 3, the preferred embodiment of a scroll saw according to the present invention is shown to include a saw frame 2, a blade retaining unit, a saw blade 4, a push rod 5, an actuating unit 6, and a biasing unit 7.

The saw frame 2 is generally C-shaped and has hollow upper and lower frame portions 21, 22. Each of the upper and lower frame portions 21, 22 has upper and lower driving arms 31, 32 mounted pivotally and respectively therein in a conventional manner. Each of the upper and lower driving arms 31, 32 has a respective distal end 311, 321.

The saw blade 4 extends between the upper and lower driving arms 31, 32, and has upper and lower blade ends 41, 42.

The blade retaining unit includes a lower blade holder 35 mounted fixedly on the distal end 321 of the lower driving arm 32 to hold removably the lower blade end 42, a pivot seat 33 mounted pivotally on the distal end 311 of the upper driving arm 31, and an upper blade holder 34 mounted on the pivot seat 33. The pivot seat 33 includes an upper seat section 332, a lower seat section 333 connected to the upper blade holder 34, and an elbow section 331 that connects the upper and lower seat sections 332, 333, and that is mounted pivotally on the distal end 311 of the upper driving arm 31. The pivot seat 33 is pivotable relative to the upper driving arm 31 from a first position, where the upper blade holder 34 engages the upper blade end 41 (see FIGS. 2 and 3), to a second position, where the upper blade holder 34 disengages from the upper blade end 41 (see FIGS. 4 and 5).

The upper driving arm 31 further has a guide block 36 secured on a top side 312 thereof. The guide block 36 is formed with a through hole 361 that permits the push rod 5 to extend slidably through the guide block 36. The upper seat section 332 of the pivot seat 33 is formed with a threaded hole 334 parallel to the upper driving arm 31. The push rod 5 has a connecting end 51 and an opposite pressing end 52. The connecting end 51 of the push rod 5 is connected threadedly to the upper seat section 332 of the pivot seat 33 in the threaded hole 334.

The actuating unit 6 includes a link member 61, an eccentric cam wheel 62, and a lever 63. The link member 61 is mounted pivotally in the upper frame portion 21, and has an upper link end 611 abutting against the pressing end 52 of the push rod 5, and a lower link end 612. The eccentric cam wheel 62 is mounted rotatably in the upper frame portion 21, and abuts against the lower link end 612. The lever 63 includes a connecting section 631 coupled to the cam wheel 62, and a handle section 632 accessible from an exterior of the upper frame portion 21 so as to drive rotation of the cam wheel 62.

The biasing unit 7 includes a first spring member 71 and a second spring member 72. The first spring member 71 is sleeved on the push rod 5, and has a first end abutting against the guide block 36 and a second end abutting against the pressing end 52 of the push rod 5. The second spring member 72 is also sleeved on the push rod 51, and has a first end abutting against the guide block 36 and a second end abutting against the upper link end 611 of the link member 61. In this embodiment, the first and second spring members 71, 72 are coiled compression springs that coil in opposite directions, and the second spring member 72 winds around the first spring member 71.

Figure 4:
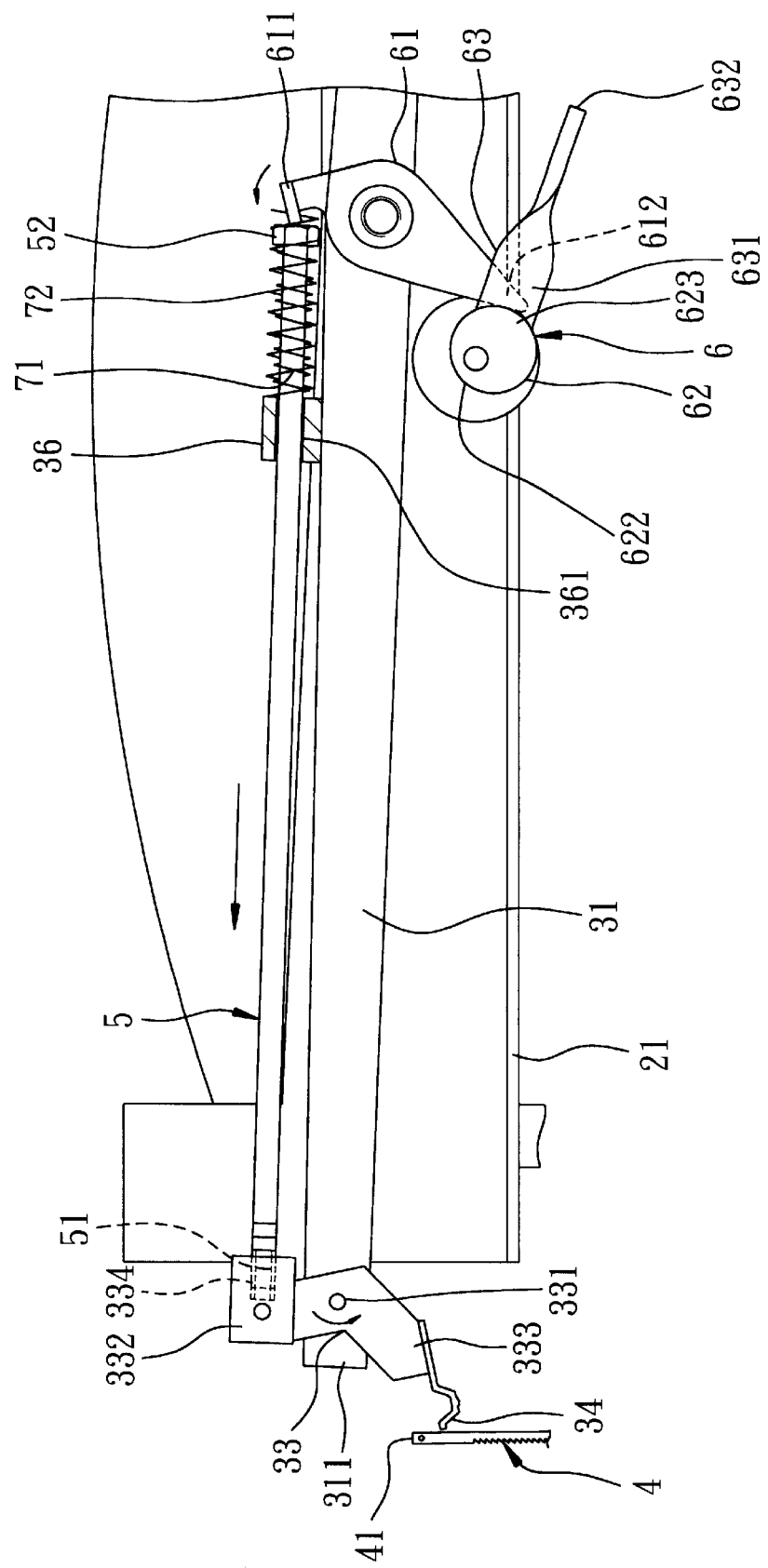
FIG. 4 is a schematic side view showing how the blade end of the saw blade is released from the driving arm in the preferred embodiment.
Figure 5:
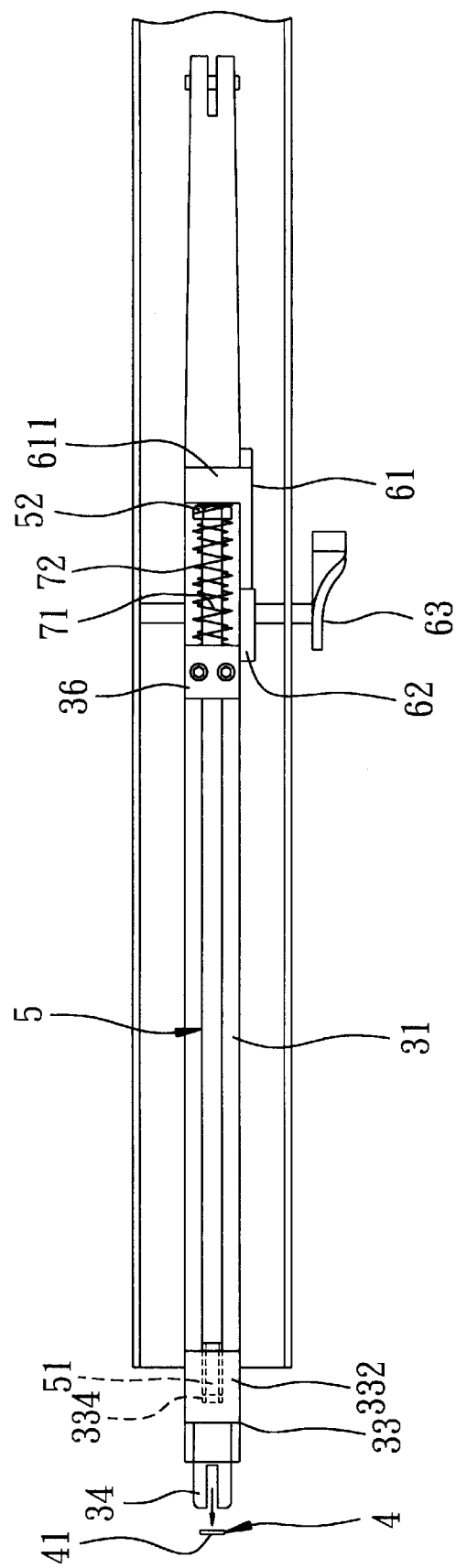
FIG. 5 is a top view showing the blade end of the saw blade when released from the driving arm in the preferred embodiment.

Referring to FIGS. 4 and 5, when the saw blade 4 is to be released, the handle section 632 of the lever 63 is operated to rotate the cam wheel 62 by 180 degrees in a first pivoting direction such that a first cam surface 623 of the cam wheel 62 is in contact with the lower link end 612 to subsequently pivot the upper link end 611 forwardly against the biasing action of the second biasing member 72. At this time, the upper link end 611 applies a pressing force on the pressing end 52 of the push rod 5 for enabling the push rod 5 to push the pivot seat 33 to pivot to the second position against the biasing action of the first biasing member 71. When the pivot seat 33 is at the second position, the upper blade holder 34 is moved rearwardly relative to the saw blade 4 so as to disengage from the upper blade end 41, thereby permitting release of the saw blade 4 from the upper and lower blade holders 34, 35 for replacement purposes.

Referring again to FIGS. 3 and 4, when the saw blade 4 is to be retained, the handle section 632 of the lever 63 is operated to rotate the cam wheel 62 by 180 degrees in a second pivoting direction opposite to the first pivoting direction such that a second cam surface 622 of the cam wheel 62 is in contact with the lower link end 612. At this time, the second biasing member 72 expands to pivot the upper link end 611 rearwardly, and the first biasing member 71 expands to enable rearward movement of the push rod 5. Accordingly, the biasing force of the first biasing member 71 enables the pivot seat 33 to pivot to the first position. When the pivot seat 33 is at the first position, the upper blade holder 34 is moved forwardly relative to the saw blade 4 so as to engage the upper blade end 41, thereby retaining the saw blade 4 on the upper driving arm 31.

Figure 6:
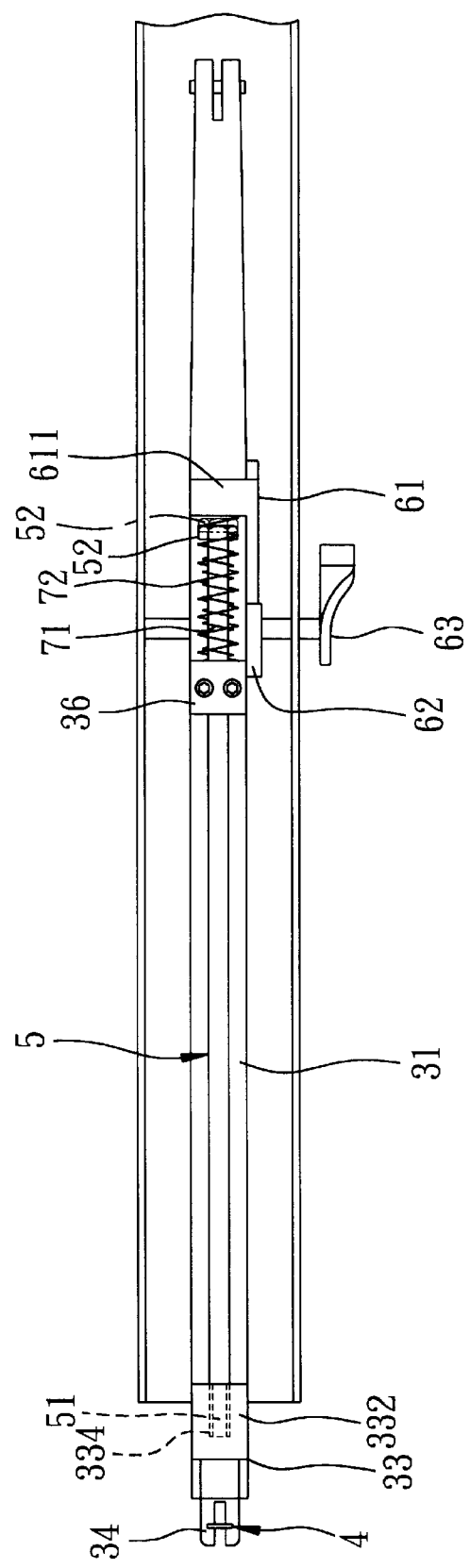
FIG. 6 is a top view showing how blade tension is adjusted in the preferred embodiment.

Referring to FIG. 6, by adjusting the threaded depth of the connecting end 51 of the push rod 5 in the threaded hole 334 of the pivot seat 33, the distance between the pressing end 52 of the push rod 5 and the pivot seat 33 is accordingly adjusted, thereby adjusting the biasing force of the first spring member 71. Therefore, the pulling force applied by the push rod 5 on the pivot seat 33 can be adjusted to adjust the tension of the saw blade 4.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:
1. A scroll saw comprising:
    upper and lower driving arms, each of which has a distal end;
    a saw blade having upper and lower blade ends;
    a blade retaining unit including a lower blade holder mounted on said distal end of said lower driving arm to hold removably said lower blade end, a pivot seat mounted pivotally on said distal end of said upper driving arm, and an upper blade holder mounted on said pivot seat, said pivot seat being pivotable relative to said upper driving arm from a first position, where said upper blade holder engages said upper blade end, to a second position, where said upper blade holder disengages from said upper blade end;
    a push rod having a connecting end coupled to said pivot seat, and a pressing end opposite to said connecting end;
    a biasing unit for providing a biasing force that enables said pivot seat to pivot to the first position; and
    an actuating unit operable so as to provide a pressing force on said pressing end of said push rod for enabling said push rod to push said pivot seat to pivot to the second position against biasing action of said biasing unit so as to permit release of said saw blade from said upper and lower blade holders.

2. The scroll saw as claimed in claim 1, wherein said pivot seat includes an upper seat section connected to said connecting end of said push rod, a lower seat section connected to said upper blade holder, and an elbow section between said upper and lower seat sections and mounted pivotally on said distal end of said upper driving arm.

3. The scroll saw as claimed in claim 2, wherein said connecting end of said push rod is connected threadedly to said upper seat section of said pivot seat.

4. The scroll saw as claimed in claim 1, further comprising a generally C-shaped saw frame having hollow upper and lower frame portions, each of said upper and lower driving arms being mounted pivotally in a respective one of said upper and lower frame portions.

5. The scroll saw as claimed in claim 4, wherein said actuating unit includes
    a link member mounted pivotally in said upper frame portion, and having an upper link end abutting against said pressing end of said push rod, and a lower link end,
    an eccentric cam wheel mounted rotatably in said upper frame portion and abutting against said lower link end, and a lever coupled to said cam wheel and accessible from an exterior of said upper frame portion so as to drive rotation of said cam wheel.

6. The scroll saw as claimed in claim 5, wherein said upper driving arm has a guide block secured thereon, said guide block being formed with a through hole that permits said push rod to extend slidably through said guide block, said biasing unit including a first spring member sleeved on said push rod and having a first end abutting against said guide block and a second end abutting against said pressing end of said push rod.

7. The scroll saw as claimed in claim 6, wherein said first spring member is a coiled compression spring.

8. The scroll saw as claimed in claim 6, wherein said second spring member is a coiled compression spring.

9. The scroll saw as claimed in claim 6, wherein said biasing unit further includes a second spring member sleeved on said push rod and having a first end abutting against said guide block and a second end abutting against said upper link end of said link member.

* * * * *